(No Model.)
T. A. EDISON.
SYSTEM OF ELECTRICAL DISTRIBUTION.
No. 509,517.  Patented Nov. 28, 1893.
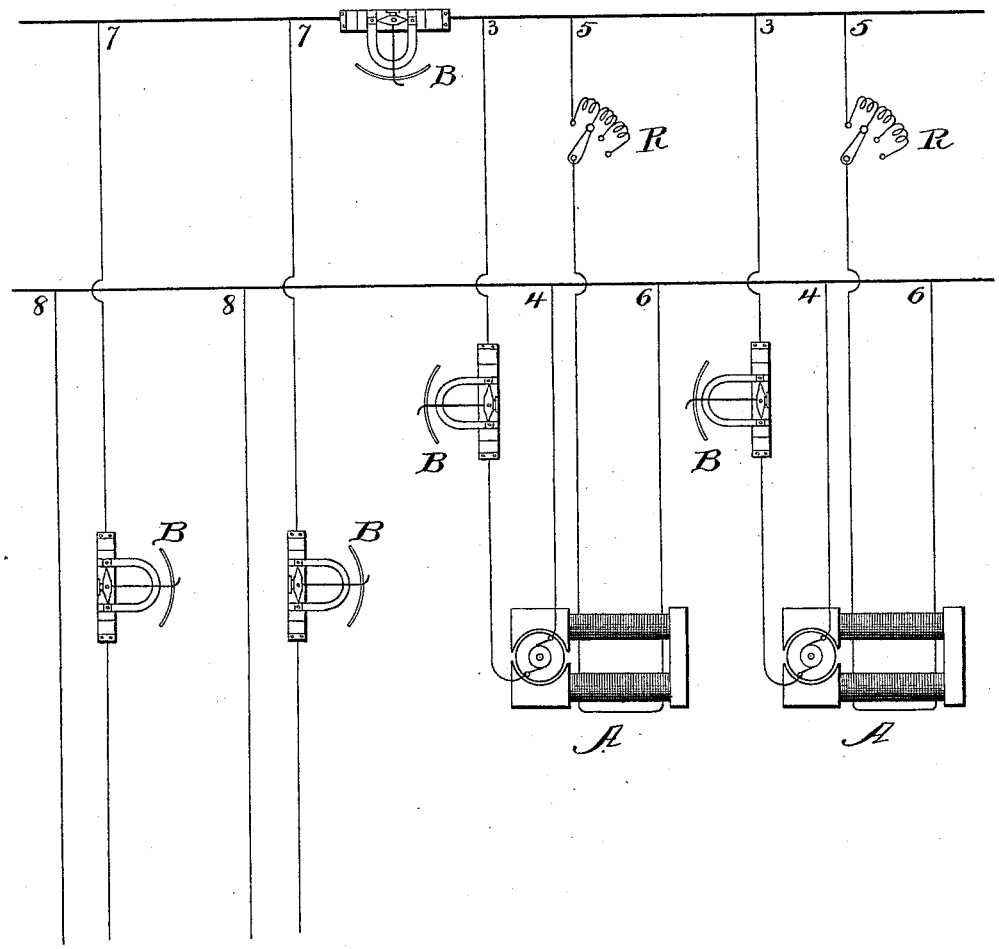
Witnesses:
J. B. McGivr.
W. Pelzer.
Inventor.
Thomas A. Edison
By Rich'd N. Dyer
Atty

UNITED STATES PATENT OFFICE.

THOMAS A. EDISON, OF MENLO PARK, NEW JERSEY.

SYSTEM OF ELECTRICAL DISTRIBUTION.

SPECIFICATION forming part of Letters Patent No. 509,517, dated November 28, 1893.

Application filed December 12, 1883. Serial No. 114,283. (No model.)

*To all whom it may concern:*

Be it known that I, THOMAS A. EDISON, of Menlo Park, in the county of Middlesex and State of New Jersey, have invented a new and useful Improvement in Systems of Electrical Distribution, (Case No. 605,) of which the following is a specification.

My invention relates to that class of systems of electrical distribution in which two or more electrical generators are employed, all connected in multiple arc with the same main conductors. In the operation of dynamo electric machines in this way difficulty was experienced in properly proportioning the load among the different machines. It was found that owing to differences of construction, variations in speed, shifting of brushes and other like causes, there were constant variations in the electro-motive force of the different machines. Some would run hot and some cold, and some would receive current from the others and run as motors consuming the energy of the system. After considerable experiment looking to the remedying of this defect I found that the best plan was to provide each generator with means for regulating its electro-motive force independently of the others and to place a current indicator or ampère-meter in the armature circuit of each machine leading to the main conductors with which they are connected. I first attempted the use of volt-indicators, but as these had to be placed in multiple arc across the circuits they constantly indicated the same volts, no matter how the current changed or in which direction it was. I therefore found it necessary to use ampère-meters which would show the variations in current strength.

My invention then consists mainly in the employment in connection with two or more dynamo electric machines feeding in multiple arc into the same main conductors, of means for regulating separately the electro-motive force of said machines, and a current indicator in the armature circuit of each machine. I prefer also to employ a current indicator in the said main conductors and a current indicator in each of the feeding circuits which may extend therefrom.

The accompanying drawing is a diagram illustrating my invention.

A A are dynamo electric machines of which there may be any required number. The armature circuit 3, 4, of each generator is connected with the conductors of a main circuit, from which may extend feeders or supplying circuits 7, 8. The field magnet coils of each machine are in a multiple arc circuit 5, 6, from the main line and in each of these circuits I place an adjustable resistance R, whereby the field magnet strength and the electro-motive force of each machine may be regulated separately. To give the indications necessary for the use of these independent regulators, I place in the armature circuit 3, 4, of each machine a current indicator or ampère-meter B. By means of these meters it is seen whether each machine is or is not delivering the right amount of current to the line or whether the whole load is properly divided among the machines. And as variations are shown by the indicators I remedy them or compensate for them in each machine by means of its regulator R. I may also place in the main circuit 1, 2, and in each of the feeding circuits 7, 8, a similar ampère-meter B.

What I claim is—

1. The combination of two or more dynamo electric machines, having their armatures connected in multiple arc with a single circuit, of an ampère-meter in the armature circuit of each machine, and means for regulating the electro-motive force of each machine independently of the others, substantially as set forth.

2. The combination of two or more dynamo electric machines, having their armatures connected in multiple arc with a single circuit, and having separate field circuits, of an ampère-meter in the armature circuit of each machine and an adjustable resistance in the field circuit of each machine, substantially as set forth.

This specification signed and witnessed this 15th day of November, 1883.

THOS. A. EDISON.

Witnesses:
H. W. SEELY,
EDWARD H. PYATT.